United States Patent
Lindner et al.

(10) Patent No.: US 6,845,855 B2
(45) Date of Patent: Jan. 25, 2005

(54) PRESSURE PLATE ASSEMBLY FOR A FRICTION CLUTCH

(75) Inventors: Joachim Lindner, Dittelbrunn (DE); Reinhold Weidinger, Unterspiesheim (DE); Erwin Ziegler, Wasserlosen (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/465,081

(22) Filed: Jun. 19, 2003

(65) Prior Publication Data

US 2004/0035669 A1 Feb. 26, 2004

(30) Foreign Application Priority Data

Jun. 19, 2002 (DE) .......................................... 102 27 330

(51) Int. Cl.⁷ .......................... F16D 13/75; F16D 13/70
(52) U.S. Cl. .................. 192/70.25; 192/111 A
(58) Field of Search ........................... 192/70.25, 111 A

(56) References Cited

U.S. PATENT DOCUMENTS

| | | |
|---|---|---|
| 6,123,180 A | 9/2000 | Weidinger |
| 6,334,520 B1 | 1/2002 | Blard et al. |
| 6,662,923 B2 * | 12/2003 | Dobler et al. ............ 192/70.25 |
| 2002/0040837 A1 * | 4/2002 | Dobler et al. ............ 192/70.25 |

FOREIGN PATENT DOCUMENTS

FR          2 782 135          2/2000

* cited by examiner

Primary Examiner—Rodney H. Bonck
(74) Attorney, Agent, or Firm—Cohen, Pontani, Lieberman & Pavane

(57) ABSTRACT

A pressure plate assembly includes a housing designed to be attached to a flywheel; a pressure plate mounted in the housing with freedom to move in a direction parallel to an axis of rotation; a stored-energy device; and a wear take-up device acting in the path of force transmission between the stored-energy device and the pressure plate, where the wear take-up device has at least one take-up element which can be moved in a take-up direction to compensate for wear. A play sensor arrangement includes a detection element provided on the pressure plate, which element, upon the occurrence of wear, makes contact or can be brought into contact with a blocking element, which is fixed in position with respect to the housing arrangement. The blocking element has a fastening area, by which it is fixed in position with respect to the housing arrangement, and a contact area, by which it makes contact with the detection element. The blocking element also has a support area so that the element can be supported with respect to the housing arrangement.

13 Claims, 4 Drawing Sheets

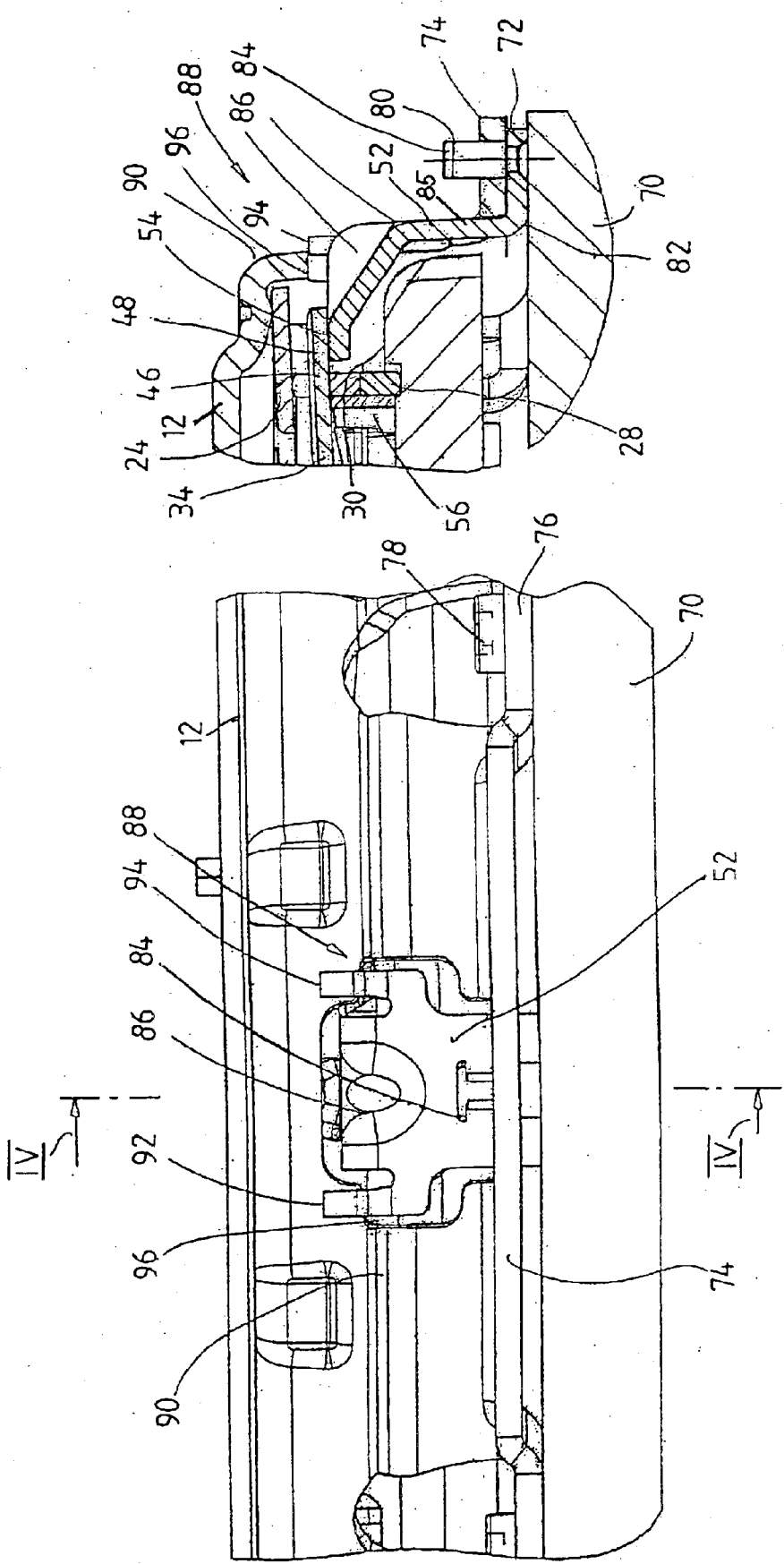

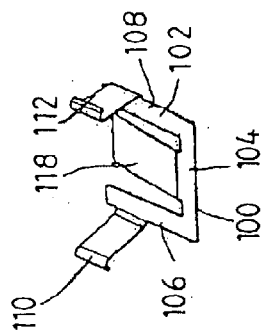
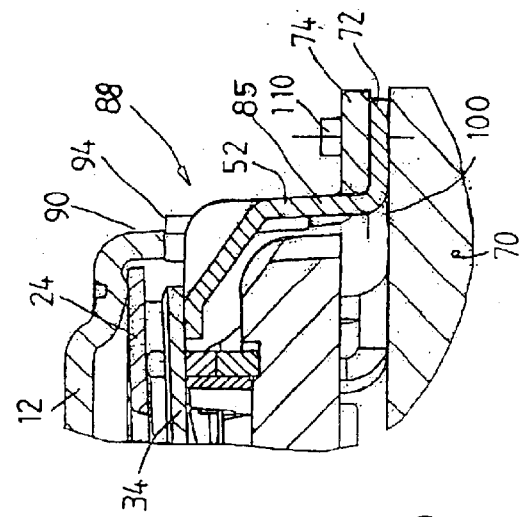
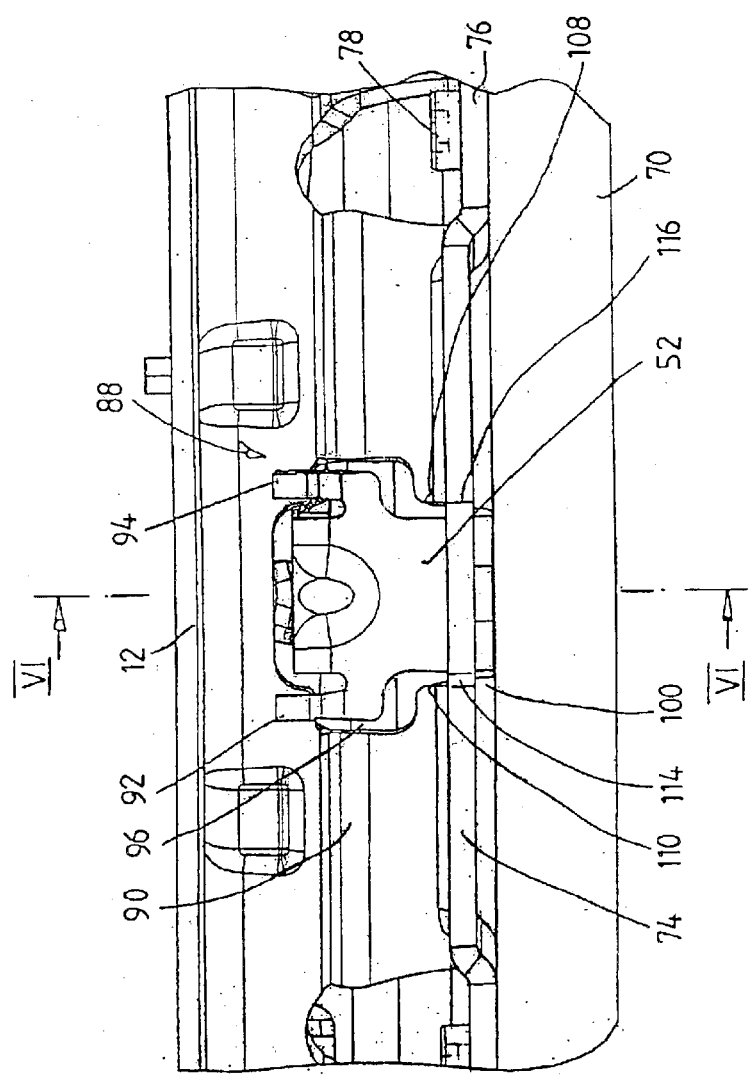

PRESSURE PLATE ASSEMBLY FOR A FRICTION CLUTCH

BACKGROUND OF THE INVENTION

1. Field of the Invention

The present invention relates to a pressure plate assembly for a friction clutch including a housing arrangement designed to be connected to a centrifugal mass arrangement; a pressure plate mounted in the housing arrangement with freedom to move in a direction parallel to an axis of rotation; a stored-energy device; and a wear take-up device acting in the path of force transmission between the stored-energy device and the pressure plate, where the wear take-up device has at least one take-up element which can be moved in a take-up direction to compensate for wear. A play sensor arrangement includes a detection element on the pressure plate, which element, upon the occurrence of wear, makes contact or can be brought into contact with a blocking element, which is in a fixed position with respect to the housing arrangement. The blocking element has a fastening area by which it is held in place with respect to the housing arrangement and a contact area by which it makes contact with the detection element.

2. Description of the Related Art

A pressure plate assembly of this type is known, for example, from U.S. Pat. No. 6,123,180. In an embodiment of this known pressure plate assembly, a plate-like blocking element, which is stamped, for example, from a metal plate is fastened by a threaded bolt to the outer circumferential area of the housing arrangement and projects from there radially inward so that it can work together by contact with the detection element. Because of its elongated shape, the blocking element is subject to comparatively severe bending loads when it contacts the detection element, which means that its flexure can cause a lack of precision in its interaction with the detection element and, thus, to this extent can cause a lack of precision in the wear take-up process to be performed in response to this interaction.

The object of the present invention is to make sure that the wear in a pressure plate assembly of this type can be detected with a high degree of precision.

SUMMARY OF THE INVENTION

According to the invention, the blocking element has a support area by which it is supported with respect to the housing arrangement.

In the pressure plate assembly in accordance with the present invention, therefore, the blocking element is held in place with respect to the housing arrangement not just by its fastening area. On the contrary, an additional area is provided to give support, so that the deformation which could be caused by the load exerted by the detection element can be counteracted.

In accordance with an especially preferred embodiment, the support area is provided between the fastening area and the contact area. To make it possible for the support area to cooperate with the housing arrangement, the support area includes at least one support section to provide support on an outer circumferential area of the housing arrangement. An especially stable support function includes at least two support sections that are a certain distance apart in the circumferential direction.

In an especially preferred embodiment, the blocking element is bent in such a way that the fastening area is axially offset with respect to the contact area. Furthermore, the support section at least one of which is provided, extends out from a section of the blocking element which connects the fastening area to the contact area.

To prevent the detection element from being deflected by the blocking element before the pressure plate is attached to the centrifugal mass arrangement, a carrier element is provided, by means of which the blocking element is carried on the housing arrangement in such a way that, before the pressure plate assembly is connected to the centrifugal mass arrangement, the blocking element is in a state in which it is unable to enter into blocking interaction with the associated detection element.

The blocking element is carried by the carrier element at the edge of the housing arrangement in the area which is to be put into contact with the centrifugal mass arrangement. When the housing arrangement and the centrifugal mass arrangement are being assembled, the carrier element is then shifted together with the blocking element in a direction parallel to the axis of rotation.

So that the blocking element is held in position with respect to the housing arrangement in a simple but nevertheless stable manner, the housing arrangement is connected to the centrifugal mass arrangement, and the blocking element is held in position by a clamping action between the housing arrangement and the centrifugal mass arrangement. It is also advantageous, after the housing arrangement has been connected to the centrifugal mass arrangement, for the blocking element to rest by its support section, of which there is at least one, against the housing arrangement under pretension. Thus, it is ensured from the very beginning that the blocking element is held in a predetermined position with respect to the housing arrangement. This also has the effect of preventing impact noises. Therefore, at least one support section of the blocking element is pretensioned against the housing arrangement by a spring element, where it is also possible for the carrier element to form the spring element.

The pressure plate assembly according to the invention may also have an arresting element, which is pretensioned by a spring into the intermediate space formed between the detection element and the pressure plate. After the detection element has been deflected with respect to the pressure plate as a result of its contact with the blocking element, the arresting element prevents the detection element from moving back out of this deflected position in the opposite direction. The arresting element may be a wedge, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 is a partial elevation view of one embodiment of the pressure plate assembly of the present invention;

FIG. 4 is a cross-sectional view of the pressure plate assembly of FIG. 3, the cross-section taken at line IV—IV of FIG. 3;

FIG. 5 is a partial elevation view, similar to that of FIG. 3, of a further embodiment of the pressure plate assembly;

FIG. 6 is a cross-sectional view of the pressure plate assembly of FIG. 5, the cross-section taken at line VI—VI of FIG. 5; and FIG. 7 is a perspective view of a spring element used in the embodiment depicted in FIG. 5.

DETAILED DESCRIPTION OF THE PRESENTLY PREFERRED EMBODIMENTS

Figure 1:
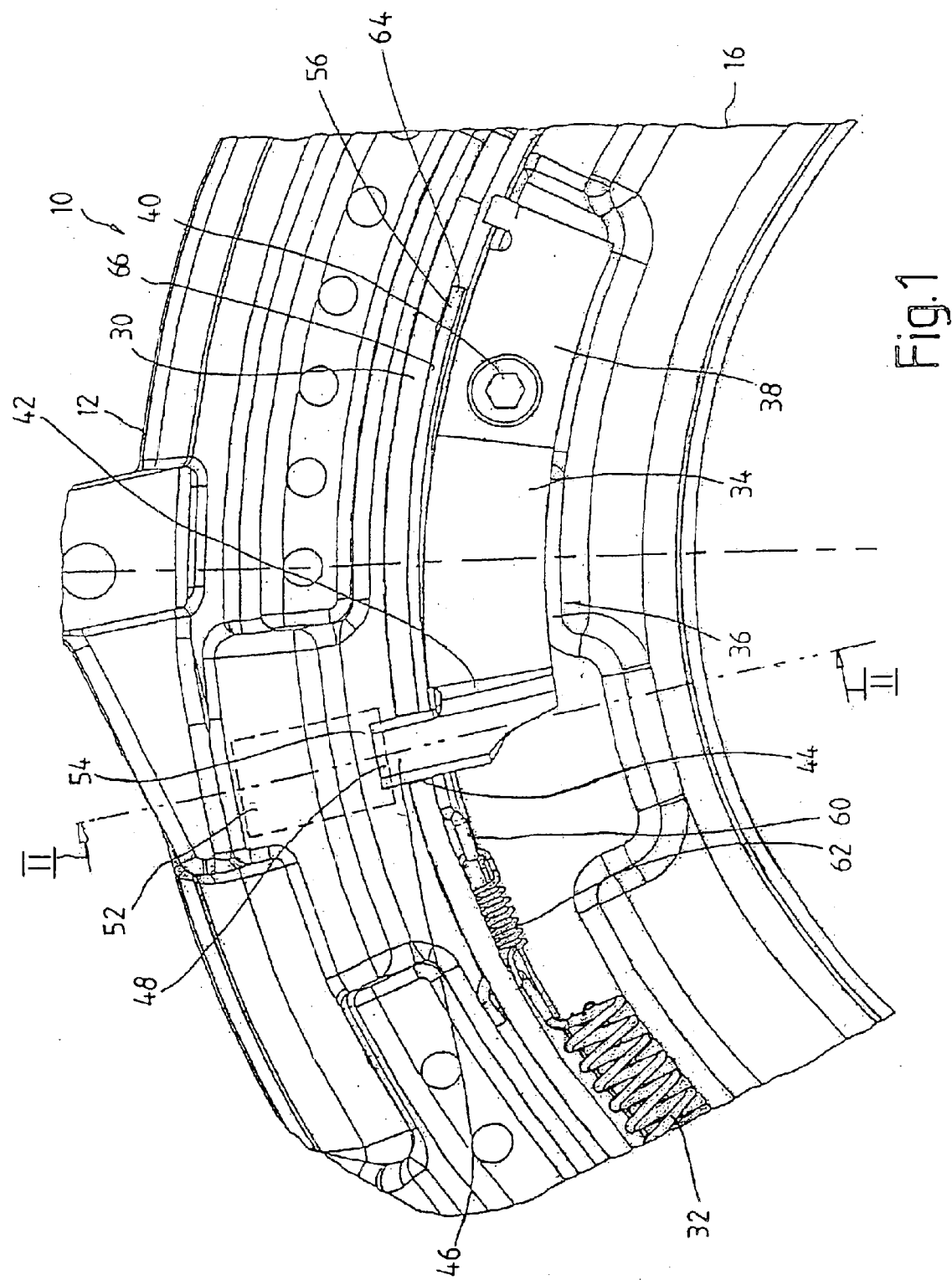
FIG. 1 is a partial plan view of a pressure plate assembly.
Figure 2:
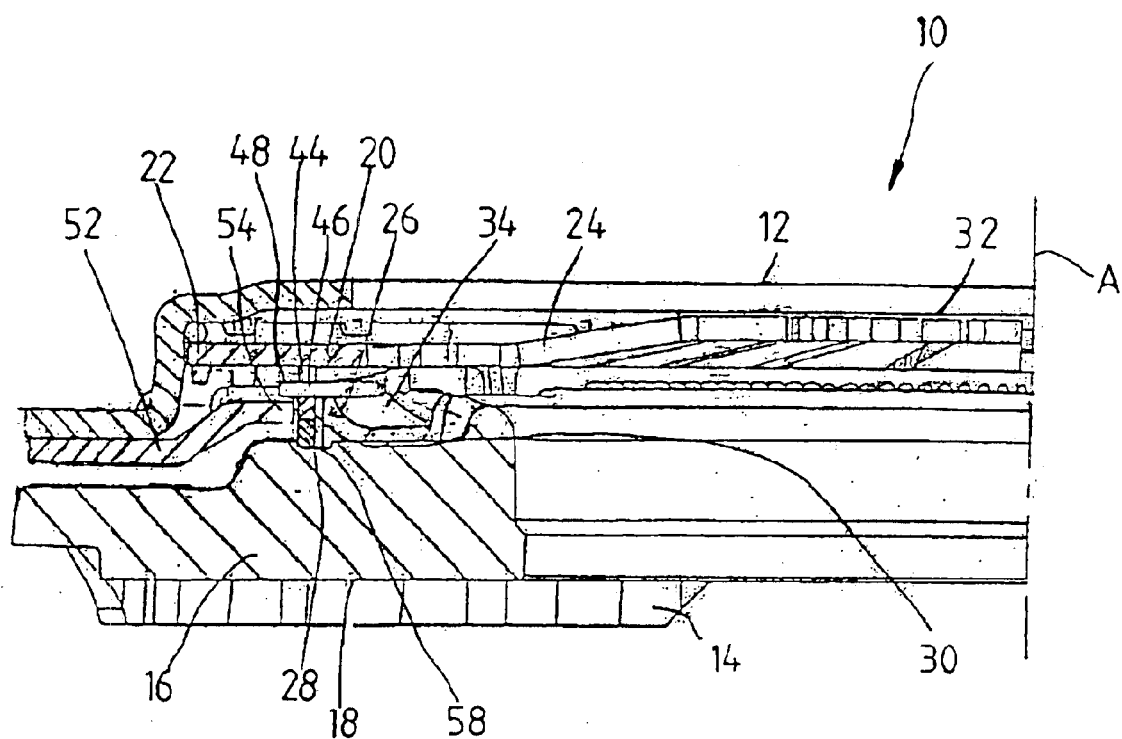
FIG. 2 is a partial cross-sectional view of the pressure plate assembly of FIG. 1, the cross-section taken at line II—II of FIG. 1.

The pressure plate assembly 10 of FIGS. 1 and 2 includes a housing 12, which is designed to be held in place at one axial end 14 on a centrifugal mass arrangement (not shown), such as a single-mass flywheel or possibly a multi-mass flywheel. Inside the housing 12, a pressure plate 16 is provided, the friction surface 18 of which can be pressed against a clutch disk (not shown). Thus, the clutch disk is forced against a corresponding friction surface of the centrifugal mass arrangement. The pressure plate 16 can be moved in a direction parallel to the axis of rotation A, depicted in FIG. 2, by elements (not shown) such as tangential leaf springs or the like, but it is essentially prevented from rotating about the axis of rotation A with respect to the housing 12.

In the housing 12, furthermore, there is also a stored-energy device 20. The radially outer area 22 of device 20 is supported on the housing 12. The radially inner area, i.e. so called spring-tongues 24 of a diaphragm spring, is acted upon with a pulling type of action by a clutch release mechanism, and its radially intermediate area acts on the pressure plate 16 by way of a wear take-up device 26, which is described further below. The description of a stored energy device 20 and a pressure plate assembly 10 of the pull type is only an example. The stored energy device 20 could also be supported on the housing 12 radially inside the area in which it acts via the wear take-up device 26 on the pressure plate and be acted on by the release mechanism with a pushing type of action. In the embodiment shown here, the wear take-up device 26 comprises two take-up rings 28, 30. The take-up ring 28 is supported on the pressure plate 16, and the take-up ring 30 acts upon by the stored-energy device 20, i.e. by the diaphragm spring. On the abutting surfaces, the two take-up rings 28, 30 have slanted or wedge-shaped areas that are complementary to each other and that are designed to extend in the circumferential direction with a wedge-like profile. A relative rotation of the two take-up rings 28, 30 with respect to each other has the result that the total axial dimension of the wear take-up device 26 is changed. So that they will rotate with respect to each other, the two take-up rings 28, 30 are pretensioned by a helical tension spring 32 installed radially inside the take-up rings 28, 30. One of the ends of the spring 32 acts on the take-up ring 28, while the other acts, for example, on the pressure plate 16.

A detection element 34 of a play sensor arrangement 36 is also provided on the pressure plate 16, radially inside the take-up rings 28, 30. The detection element 34 is fastened at one circumferential end 38 to the pressure plate 16 by a threaded bolt 40. At its other circumferential end 42, the detection element 34 has a detection section 46, which extends radially outward through an opening 44 in the take-up ring 30, this opening extending in both the circumferential and axial directions. The detection element 34 is produced of elastic material such as spring steel sheet and is pretensioned in its installed position in such a way that it exerts force axially on the take-up ring 30, and, thus, on the entire wear take-up device 26. As a result of this pretensioning effect, the two take-up rings 28, 30 are clamped between the detection section 46 and the pressure plate 16, so that even the pretensioning effect of the spring 32 cannot cause the take-up rings 28, 30 to move with respect to each other in a rotational direction such that the total axial dimension of the wear take-up device 26 is increased. The free end 48 of the detection section 46 of the detection element 34 extends over a radially inward-projecting blocking element 52, which extends up as far as the take-up rings 28, 30. The attachment of blocking element 52 is described in detail below with reference to FIGS. 3–7. As can be seen clearly FIG. 1, a radial overlap exists between the end area 48 and a corresponding end area 54 of the blocking element 52.

An arresting element 56 is also assigned to the detection element 34 of the play sensor arrangement 36. This arresting element 56 extends radially inside the take-up rings 28, 30 or rests against their inner circumferential surface and is guided in an appropriately designed recess 58 in the pressure plate 16, in which recess the take-up ring 28, which also rests on the pressure plate 16, is guided. A second helical tension spring 62 acts on one circumferential end 60 of the arresting element 56. The other end of tension spring 62 is attached or hooked onto the helical tension spring 32, namely, to the end at which spring 32 interacts with the take-up ring 28, which, as will be described further below, is able to rotate in the circumferential direction around the axis of rotation A. The take-up ring 30 is essentially prevented from rotating in the circumferential direction by the detection element 34, i.e., by the detection section 46, which engages in the opening 44. The size of the arresting element 56 in the axial direction increases as it proceeds from its end area 60 toward its free end area 64, because the arresting element 56 has a wedge-like shape in the circumferential direction between its two ends 60, 64. Thus, the arresting element 56 has its smallest axial dimension in the area where, as shown in FIG. 1, the detection section 46 is positioned over it, whereas, it has its largest axial dimension in the area close to the end 64. As a result of the action of the spring 62, the arresting element 56 is pretensioned in the circumferential direction and pulled until its surface 66, positioned in a wedge-like manner, contacts the detection section 46 of the detection element 34 and can no longer move in the circumferential direction.

The functioning of the pressure plate assembly 10 according to the present invention, during rotational operation, especially upon the occurrence of wear, is as follows.

When the friction linings normally provided on the clutch disk are new and unworn, the two take-up rings 28, 30 assume a predefined relative rotational position when the pressure plate assembly 10 is assembled. In this position, the wear take-up device 26 occupies the smallest possible amount of axial space as a result of the corresponding relative positioning of the slanted surface areas, and the spring 32 is also pretensioned by the maximum amount.

In this state, as previously described, the take-up rings 28, 30 are prevented from rotating with respect to each other by the pretensioning effect of the detection element 34. In the engaged state of the clutch, the take-up ring 30 is acted upon by the stored-energy device 20. As a result, the pressure plate 16, which is resting against the clutch disk in this state, and the resulting counterforce additionally have the effect of preventing the two take-up rings 28, 30 from moving. The blocking effect provided by the stored-energy device 20 is much stronger than that of the detection element 34, because the force provided by the stored-energy device 20 is much greater than the pretensioning force of the detection element 34.

While the pressure plate assembly 10 is new, furthermore, it is also possible for the end section 48 of the detection section 46 to be a certain axial distance away from the opposing end section 54 of the blocking element 52.

When the friction linings undergo wear during operation as a result of, for example, the numerous repetitions of clutch-engaging and clutch-disengaging operations, the pressure plate 16, when in the engaged state, is increasingly closer to the centrifugal mass arrangement, which, in the diagram of FIG. 2, corresponds to a downward movement of the pressure plate 16 with respect to the housing 12. As this occurs, the end section 48 of the detection section 46 also moves closer to the blocking element 52. When the amount of wear exceeds a certain value, the blocking element 52 prevents the detection section 46 from moving any farther. This means that, after additional wear has occurred and when, for example, a clutch-engaging operation is performed, the detection section 46 is held axially in place by the blocking element 52 and is lifted from the take-up ring 30 as a result of the further axial movement of the pressure plate 16 which occurs. Axial play develops between the detection section 46, which had previously been resting on the take-up ring 30, and take-up ring 30. Because the stored-energy device 20 is still acting on the take-up rings 28, 30, during the clutch-engaging operation and then in the engaged state of the clutch, it is still impossible for the two take-up rings 28, 30 to execute any relative rotation even though the detection element 34 is no longer blocking them. Since the further movement of the detection section 46 is blocked, it should be possible, in principle, for the detection section 46 to be lifted from the wedge surface 66 of the arresting element 56. However, since arresting element 56 is under the pretensioning force of the spring 62, the arresting element 56 moves into the intermediate space which forms as soon as the lifting movement of the detection section 46 begins. The result is that, when the clutch is then disengaged, during which process the end section 48 of the detection section 46 rises even farther from the blocking element 52, this detection section 46 cannot return and make contact again with the wear take-up device 26, which is still being prevented at this point by the stored-energy device 20 from executing a take-up movement. Therefore, the previously wear-induced play between the detection section 46 and the take-up ring 30 remains preserved initially in this phase of the beginning of the clutch-disengaging operation.

The take-up ring 28 can move in the circumferential direction under the action of the helical tension spring 32 only during a subsequent clutch-disengaging operation, during which, as a result of the elimination or reduction of the force being exerted by the stored-energy device 20, the clamping action of the two take-up rings 28, 30 with respect to each other is either eliminated more-or-less completely or continues to be provided only by the tangential leaf springs, which return the pressure plate 16 to its starting position and which have only a relatively weak axial pretensioning force. The take-up ring 30 is prevented from moving in the circumferential position by the detection element 34. During this relative rotation between the two take-up rings 28, 30 and the accompanying sliding movement of the various slanted surface areas along each other, the wear take-up device 26 changes its axial dimension until the take-up ring 30 makes contact again with the detection section 46. The axial dimension of the wear take-up device 26 has then been changed essentially to the same extent that previously the detection section 46 was lifted from the take-up ring 30, which dimension corresponds in turn essentially to the extent by which the pressure plate 16 has moved closer, as a result of wear, to the centrifugal mass arrangement in the engaged state. This means ultimately that, when a wear take-up process such as this takes place, the amount of wear which is taken up is essentially the same as that which was in fact previously detected by the play sensor arrangement 36. The result is that the axial dimension between the friction surface 18 of the pressure plate 16 and the area or point at which the stored-energy device 20 acts on the wear take-up device 26 has been increased to the same extent that the thickness of the friction linings has decreased. The original position of the stored-energy device 20 thus remains unchanged even upon the occurrence of wear, and thus there is no change in the clutch-engaging or clutch-disengaging characteristics of a pressure plate assembly of this type.

Because the spring 62 is hooked onto the end of the spring 32, which works together with the movable take-up ring 28, the spring 62 is not allowed to relax to any significant extent, even as the amount of wear increases and the circumferential movement of the arresting element 56 increases. Instead, the movement which the take-up ring 28 performs during the course of a wear take-up process has the result of increasing the tension on the spring 62, since the arresting element 56 is now being held in place again, so that, when more wear occurs, essentially the same amount of pretensioning force for moving the arresting element 56 in the circumferential direction is available again.

The design of the pressure plate assembly with wear take-up described above can be modified in a wide variety of ways. For example, the wear take-up device 26 can have only a single take-up ring, which, when wear occurs and a compensation process is executed, is able to move in the circumferential direction around the axis of rotation A. The slanted surface areas on this single take-up ring are able to slide along complementary slanted surface areas on the pressure plate. It is also possible to provide several wear take-up elements which are able to move independently of each other and do not necessarily have to be in the shape of rings. Individual wedge elements, which are controlled by associated spring arrangements and which cooperate with separate detection elements, can also be provided.

It can be seen in FIGS. 3 and 4 that the blocking element 52 is bent at an angle in essentially two places, and thus has an approximately S-shaped or Z-shaped contour. In a first terminal web area 72, which forms the fastening area of the blocking element 52, the blocking element 52 is held in a fixed position with respect to the housing 12 after the housing 12 has been attached to a centrifugal mass 70. It can be seen that this terminal web area 72 extends radially toward the outside and is held in place between a circumferential section 74 of a radially outward-projecting edge area 76 of the housing 12, this section being a certain distance away from the centrifugal mass 70, and the centrifugal mass 70. At this edge area 76, the housing 12 is attached to the centrifugal mass 70 by threaded bolts 78, distributed around the circumference. After the housing 12 has been attached to the centrifugal mass 70, the terminal web area 72 is clamped firmly between the section 74 of the edge area 76 and the centrifugal mass 70. A carrier element 80 is provided on this terminal web area 72; this carrier element 80 passes through an appropriate opening 82 in the section 74 of the edge area 76 and has a certain amount of clearance there. The blocking element 52 is thus held by this carrier element 80 on the housing 12, but before the centrifugal mass 70 has been brought up into position, the carrier element 80 can still shift within the opening 82 until it comes to rest by its expanded head area 84 against the section 74. The blocking element 52 is thus held in a position in which it cannot interact with the detection element 34, which means that, even before the housing 12 has been attached to the centrifugal mass 70, the danger of an undesired deflection of the detection element 34 can be avoided. When the housing 12 is attached to the centrifugal mass 70, the centrifugal mass 70 moves the terminal web area 72 together with the carrier element 80 with respect to the section 74 of the edge area 76 in a direction parallel to the axis of rotation A until, as already discussed above, the terminal web area 72 is firmly clamped between the centrifugal mass 70 and the section 74 of the edge area 76.

The end area 54 of the blocking element 52, which is axially offset from terminal web area 72 and which is provided to interact with the detection element 34, forms a second terminal web area, which is connected to the previously discussed terminal web area 72 by a connecting section 85 extending more-or-less in the axial direction. In the transition area between the connecting section 85 and the terminal web area forming the end area 54, it is possible to obtain increased resistance to deformation by providing appropriate formations 86. This is not possible in the transition area between the first terminal web area 72 and the connecting section 85, because this area is clamped between the section 74 of the edge area 76 and the centrifugal mass 70. There would therefore in principle be the danger that, when force is exerted on the end area 54 by the detection element 34, the blocking element 52 could be bent over, especially in the transition area between the connecting section 85 and the terminal web area 72. To counteract this, a support area 88 is provided on the blocking element 52; this support area 88 supports the blocking element 52 on an outer circumferential area 90 of the housing 12. As can be seen in FIG. 3, the support area 88 comprises two support sections 92, 94, which proceed from the connecting section 85 and are a certain distance apart from each other in the circumferential direction. These extend approximately in a direction parallel to the axis of rotation A and rest on the outer circumferential area 90 of the housing 12 in an area which surrounds an opening 96 in the housing 12, through which the blocking element 52 passes. The arrangement is preferably designed so that, when the terminal web area 72 is firmly clamped between the section 74 and the centrifugal mass 70, the support sections 92, 94 of the blocking element 52 are pretensioned by their own elasticity and shape against the outer circumferential area 90 of the housing 12.

Because of the firm support of the blocking element 52 in the area between the point on the one side where the blocking elements 52 is held on the housing 12 and the point on the other side where the blocking element 52 cooperates with the detection element 34, the goal is achieved that, even when an axial load is exerted on the end area 54, the blocking element 52 will not be deformed, which means that the amount of wear which has occurred can be detected with the desired degree of precision.

In FIGS. 5–7, an alternative embodiment of the pressure plate assembly is illustrated. The blocking element 52 corresponds essentially to the design described above and also has in this case the two support section 92, 94 to support the blocking element 52 on the outer circumferential area 90 of the housing 12. In the embodiment of FIGS. 5–7, furthermore, a spring element 100 also is provided to act as a carrier element. This element 100 has a U-shaped frame area 102, which can be permanently connected to the terminal web area 72 of the blocking element 52 by brazing, bonding with an adhesive, or welding, so that a connecting web section 104 of the U-shaped frame area 102 is positioned radially on the inside, a permanent connection not being required here. The two retaining sections 110, 112 include ends which are designed as hooks. Retaining sections 110, 112 proceed from the ends of the two side pieces 106, 108 of the U-shaped frame 102 in a direction approximately perpendicular to the plane defined by the frame 102 and pass through associated openings 114, 116 in the section 74 of the edge area 76. These retaining sections 110, 112 hold the blocking element 52 on the housing 12 prior to attaching the housing 12 to the centrifugal mass 70. The blocking element 52 is held in such a way that it retains some freedom of movement and therefore cannot interact with the detection element 34. The retaining sections 110, 112 move into their assigned openings 114, 116 only after the housing 12 has been brought into position, so that the terminal web area 72 of the blocking element 52 is pushed closer to the section 74 of the edge area 76.

In the embodiment of FIGS. 5–7, in order to relax the manufacturing tolerances for the blocking element 52, the intermediate space formed between the section 74 of the edge area 76 and the centrifugal mass 70 in the assembled state are made slightly larger than the thickness of the terminal web area 72 of the blocking element 52 plus the thickness of the frame area 102 of the spring element 100. That is, even after the housing 12 and the centrifugal mass 70 have been permanently attached to each other, the terminal web area 72 is not firmly clamped. Instead, in this embodiment, the spring element 100 has a spring tongue area 118, which proceeds from the connecting web 104 and is shaped in such a way that it rests under pretension against the centrifugal mass 70, whereas the legs 106, 108 then rest under appropriate pretension on or exert force on the blocking element 52. As a result of the pretensioning effect of the spring element 100, the blocking element 52 is tilted in the counterclockwise direction in FIG. 6, so that its support sections 92, 94 rest again under pretension against the outer circumferential area 90 of the housing 12. In the area near the centrifugal mass arrangement, the blocking element 52 is supported in the transition area between the connecting section 84 and the terminal web area 72 in the radially outward direction on the section 74 of the edge area 76. Thus, even when force is exerted by the detection element 34, the blocking element 52 is held in a defined position with respect to the housing 12 by support in two areas that are a certain axial distance apart, so that the blocking element 52 can be neither shifted nor deformed.

The present invention proposes easy-to-realize but still extremely effective measures for increasing the precision with which wear can be detected, because it is impossible for the blocking element to become deformed under load. It is obvious that various modifications can be made to the components designed in accordance with the invention. Thus, for example, it is obvious that more than the two support sections shown can be present. It is also obvious that the design with the spring element serving as a pretensioning and retaining element can be combined with the carrier element 80 of the embodiment illustrated in FIGS. 3 and 4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a friction clutch, said pressure plate assembly comprising:

a housing which can be fixedly connected to a centrifugal mass arrangement for joint rotation about an axis of rotation;

a pressure plate mounted in the housing so that the pressure plate is axially displaceable relative to the housing;

a stored-energy device for transmitting axial force to the pressure plate along a path of force transmission;

a wear take-up device acting in the path of the force between the stored-energy device and the pressure plate, the wear take-up device comprising at least one take-up element which can be moved in a take-up direction to compensate for wear of the friction clutch;

a blocking element having a fastening area which is fixed with respect to said housing, a contact area which is located distally with respect to said fastening area, and a support area which supports said blocking element radially against an outer circumferential area of the housing in order to resist deformation of said blocking element; and a detection element fixed to said pressure plate so that said detection element comes into contact with said contact area of said blocking element when wear of said friction clutch occurs.

2. The pressure plate assembly of claim 1, wherein the support area is disposed between the fastening area and the contact area.

3. The pressure plate assembly of claim 1, wherein the support area comprises at least two circumferentially spaced support sections.

4. The pressure plate assembly of claim 1, wherein the blocking element comprises a connecting section between the fastening area and the contact area; the fastening area being axially offset with respect to the contact area, the support area extending axially outward from the connecting section.

5. The pressure plate assembly of claim 1, further comprising a carrier element for connecting the blocking element to the housing, the carrier element permitting movement of the blocking element prior to connecting the pressure plate assembly to the centrifugal mass arrangement so as to prevent the blocking element from engaging the detection element.

6. The pressure plate assembly of claim 5, wherein the housing comprises an edge area and wherein the carrier element carries the blocking element in the edge area so as to place the blocking element in contact with the centrifugal mass arrangement.

7. The pressure plate assembly of claim 6, wherein the carrier element and the blocking element are displaceable substantially in a direction parallel to the axis of rotation when the housing is being connected to the centrifugal mass arrangement.

8. The pressure plate assembly of claim 6, wherein the blocking element is fixidly clamped between the housing and the centrifugal mass arrangement.

9. The pressure plate assembly of claim 1, wherein the support area is pretensioned against the housing after the centrifugal mass arrangement is connected to the housing.

10. The pressure plate assembly of claim 9 further comprising a spring element which pretensions the support area against the housing.

11. The pressure plate assembly of claim 10, wherein the spring element connects the blocking element to the housing, the spring element permitting movement of the blocking element prior to connecting the pressure plate assembly to the centrifugal mass arrangement so as to prevent the blocking element from engaging the detection element.

12. The pressure plate assembly of claim 1, further comprising a spring and an arresting element pretensioned by the spring into an intermediate space between the detection element and the pressure plate, whereby the detection element can be prevented from returning from a deflected position after the blocking element has deflected it with respect to said pressure plate.

13. The pressure plate assembly of claim 12, wherein the arresting element comprises a wedge.

* * * * *